April 10, 1934.    J. G. CAPSTAFF    1,954,346
PHOTOGRAPHIC COLOR PROCESS
Original Filed Sept. 18, 1923    2 Sheets-Sheet 1

Fig.1.

4 Green sensitive layer.
3 Red sensitive layer.
1 Support.

Fig.2.

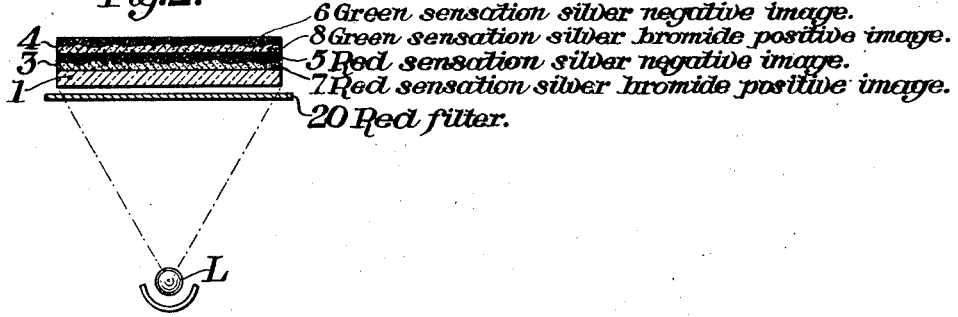
6 Green sensation silver negative image.
8 Green sensation silver bromide positive image.
5 Red sensation silver negative image.
7 Red sensation silver bromide positive image.
20 Red filter.

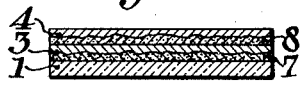 
8 Green sensation silver bromide positive image.
9 Red sensation silver positive image.

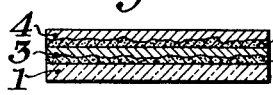 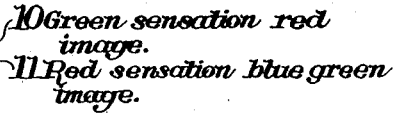 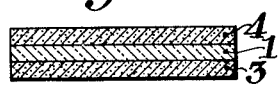
10 Green sensation red image.
11 Red sensation blue green image.

Fig.7.

Inventor:
John G. Capstaff,
By Newton ＿＿＿
Attorney.

April 10, 1934.　　　J. G. CAPSTAFF　　　1,954,346
PHOTOGRAPHIC COLOR PROCESS
Original Filed Sept. 18, 1923　2 Sheets-Sheet 2
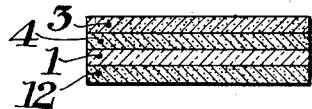
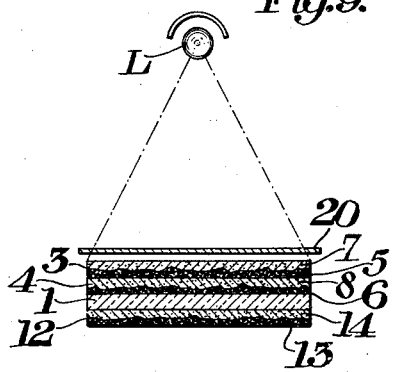
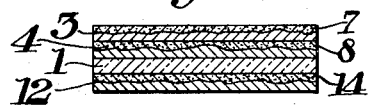
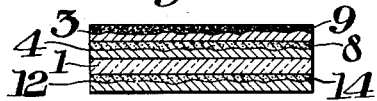
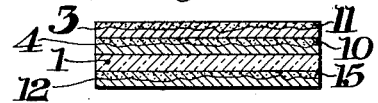
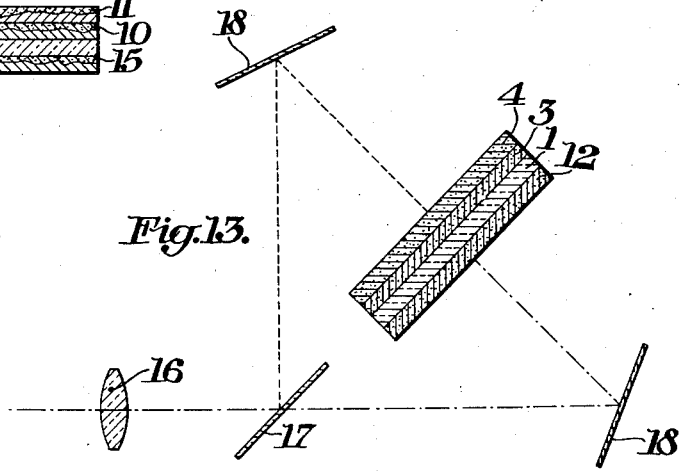
Inventor:
John G. Capstaff,
By Newton M. Perrin
Attorney.

Patented Apr. 10, 1934

1,954,346

UNITED STATES PATENT OFFICE 1,954,346

PHOTOGRAPHIC COLOR PROCESS

John G. Capstaff, Rochester, N. Y., assignor to Eastman Kodak Company, Rochester, N. Y., a corporation of New York Original application September 18, 1923, Serial No. 663,484. Divided and this application October 8, 1931, Serial No. 567,542

13 Claims. (Cl. 95—2)

This invention relates to color photography and more particularly to a process by which a sensitive element is given a single exposure in an ordinary camera and so treated as to yield a multicolor print in accordance with the color of the subject. The process is particularly applicable to superposed differentially sensitized layers. This application is a division of my application Serial No. 663,484, filed September 18, 1923.

Briefly, the process consists of exposing to a multicolor light image an emulsion or multilayer element containing particles differentially sensitized to different colors, developing the affected particles, and then exposing the still unaffected particles to light of a single color, such as red, whereby one set of particles will be affected and the others will not be. The silver image is then removed and the affected particles developed, thereby yielding a silver image corresponding to one color and a silver bromide image corresponding to another color. The two images are converted by known processes into appropriately colored images.

Where possible, reference is made to the drawings accompanying this specification, in which the same reference characters refer throughout to the same elements. The same elements may be differently arranged in different forms. All of the figures are enlarged sections of photographic plates.

Fig. 1 shows a form of photographic element with which my process may be carried out;

Figs. 2, 3, 4 and 5 illustrate different steps of my process as carried out with the plate shown in Fig. 1;

Fig. 6 shows a second form of plate;

Fig. 7 shows the color images formed by my new process in the emulsions of the plate shown in Fig. 6;

Fig. 8 shows a third form of plate;

Figs. 9, 10, 11 and 12 illustrate different steps of the process as carried out with the form shown in Fig. 8;

Fig. 13 shows a fourth form of plate, with a diagram of an optical system used therewith, and Fig. 14 shows the finished plate resulting from the form indicated in Fig. 13.

The complete process will now be described in detail.

Step A.—Emulsions of particles predominately sensitive to light of one color are made. There is no point of particular interest or importance in this step as the making of such emulsions is well known and the present emulsions are given by way of examples. An ordinary bromide emulsion is sensitized with a suitable dye, such as brilliant green, Pinacyanol Color Index 808, Pinacyanol blue Color Index 809, Naphthocyanol Color Index 809, Pinachrome violet Color Index 807, Pinachrome blue Color Index 808, or any other suitable dye, sensitizing for red but not for green, or Erythrosine Color Index 772, basic Rhodamin Color Index 749, Rhodamin B Color Index 749, Rhodamin 6 G Color Index 752, or any other suitable dye sensitizing for green but not for red. For this purpose the dye solution is extremely dilute, say about 1 part in 5000, and does not give a permanent perceptible color to the sensitive particles or the emulsion. In the process as now being described two emulsions only will be considered, though processes including a greater number are also contemplated.

A preferred method for carrying out the invention is to prepare two emulsions, one sensitized to red with Naphthocyanol and the other sensitized to green with Rhodamin B. The emulsions are prepared and the sensitizers are added in a known manner. The proportion of sensitizer used is of the order of 1 to 10,000. The two emulsions are carried through the usual stages of preparation and are chilled, shredded, and washed in the usual way. Any excess of sensitizing dye is removed by washing. The result is that the sensitizers remain firmly adsorbed to the silver halide grains but are not in sufficient concentration to act as efficient light screening layers.

Step B.—The several emulsions are separately redissolved and coated, one over the other, as shown in the several figures, on a suitable support 1, such as a transparent plate or film, or on paper. The article as a whole is referred to hereinafter as a plate including in the term a support of any material.

In Fig. 1 is illustrated a plate comprising a support 1, having thereon an under layer 3 which contains red sensitive particles and an upper layer 4 containing green sensitive particles only. The under layer 3 may contain red sensitive particles only, or it may be an ordinary panchromatic emulsion. In the latter case, the upper layer must have a temporary minus-green dye, preferably the sensitizing dye, acting to screen the green light from reaching the lower layer.

Step C.—The plate is then exposed in any suitable photographic apparatus, camera, projector or printing machine to a colored light image. This exposure will usually be through a yellow filter as the salts are sensitive to blue light.

*Step D.*—The plate is then fully developed. I use customarily a developer of the type known as "process" developer, giving a high degree of contrast. A typical formula is the following:

A. Sodium bisulfite _____ 25 gms.
   Hydroquinone _____ 25 gms.
   Potassium bromide _____ 25 gms.
   Water _____ 1 liter
B. Sodium hydroxide _____ 50 gms.
   Water to _____ 1 liter Mix equal parts A and B. This produces silver negative image 5 and 6 corresponding to the affected particles of both kinds, and leaves undeveloped particles of both kinds which constitute positive, silver salt, color record images 7 and 8. All these images are, of course, in registry.

*Step E.*—The plate is now exposed to a monochromatic light capable of affecting one kind of particle but not the other, say a red light of wave length to which the green sensitive particles are insensitive.

The plate is exposed to red light preferably through support 1. This is indicated in Fig. 2. Rays from lamp L pass through red filter 20 and the support 1 to the red sensitive layer 3 and are less liable to have any fogging action on the green sensitive salts in the upper layer 4 than if they were exposed from the front. Exposure may be made from the front, however, if proper precautions as to the filter are taken.

*Step F.*—The silver negative image is then removed in a bath which does not destroy the developability of the affected salts nor render the unaffected salts developable; such a bath is the following:

Potassium bichromate _____ 2 grams
Sulfuric acid, conc. _____ 2 cc.
Water to _____ 1 liter It is then thoroughly washed. This leaves only the positive silver bromide images 7 and 8 (Fig. 3).

*Step G.*—The plate is then developed in any ordinary developer, such, for instance, as the following, of the "M-Q" type:

Monomethyl paramidophenol sulfate__ 2.3 gms.
Sodium sulfite _____ 50 gms.
Hydroquinone _____ 9 gms.
Sodium carbonate _____ 5 gms.
Potassium bromide _____ 1 gm.
Water _____ 1 liter There is thus produced the lower layer 3, a silver image 9, which is a positive, red-sensation record, and in the upper layer 4 a silver bromide image 8, which is a positive, green sensation record.

*Step H.*—Having two distinct images of known different kinds it is possible, by very numerous processes, to treat them selectively in such a way as to transform one into one color image and the other into another color image. The color to which each should be transformed should be complementary to the other which it records, for projection by white light transmitted through the plate, that is to say a subtractive color record is obtained. The particular color to which each is transformed is governed by the color sensitivity of the salts used. Being a two color process, it does not, of course, accurately reproduce all colors and the color rendering is necessarily adapted to the nature of the subjects and to the projection light used.

A convenient and simple method is to tone the silver image into a bluish green image 11 and to convert the bromide image into a mordanted dye image 10. For instance the plate is submitted to any of the well known baths converting the bromide image into an iodide or into a copper or uranium salt, or to any other salt to which dyes will be mordanted. A preferred bath is the following:

Potassium iodide_____ 5 gms.
Water to _____ 1 liter

It is then submitted to a dye of appropriate color which will be mordanted thereto. This transforms the silver bromide image into one of silver iodide.

The plate will then be submitted to the following bleaching bath:

Potassium ferricyanide _____ 100 gms.
Ammonia (conc. 89) _____ 20 cc.
Water to _____ 2 liters and after thorough washing to the following toning bath:

Ferric ammonium sulfate_____ 20 gms.
Potassium bromide_____ 10 gms.
Hydrochloric acid (conc.)_____ 4 cc.
Water to _____ 2 liters This converts the silver image into an iron salt having a green color and resistant to most dye mordanting processes. Since such dyeing and toning methods are very well known, I will not dwell on them at length. Numerous appropriate methods are described in "Tinting and Toning of Eastman Positive Motion Picture Films" published by the Eastman Kodak Company in 1918, and elsewhere in photographic literature.

There is thus produced a subtractive color record in two colors. At the end of Step G, as above described, there are a silver image and a silver bromide image on the same plate.

The differentially sensitized emulsions may also be on opposite sides of the support, as in Fig. 6, Form C, where 1 indicates the support, 3 the red sensitive layer and 4 the green sensitive layer. The process would be carried through just as outlined, the first exposure being made through the green sensitive layer. The final print would be formed of a red image 10 in the originally green sensitive layer 4 and a registering green image 11 in the originally red sensitive layer 3, as shown in Fig. 7.

Allied modifications capable of use in three color photography are shown in Fig. 8. This comprises a red sensitive or panchromatic emulsion 3, and an inner green sensitive emulsion 4 carried on one side of support 1, upon the other side of which is a blue sensitive emulsion 12. If the layer 3 is panchromatic, the layer 4 will contain a temporary minus-green dye for the reasons described in connection with Form B.

The plate is exposed, with the layer 12 in front, to a color image, the light rays passing successively through layer 12, the support 1, and the successive layers 4 and 3. The plate is developed, yielding negative, silver, color component image 13, 6 and 5, and positive, silver bromide, color component images 14, 8 and 7, in the sensitive layers 12, 4 and 3 respectively, as shown in Fig. 9. This is now exposed to red light, obtained from rays from lamp L passing through red filter 20, Fig. 9, acting only on the red sensitive or panchromatic layer 3, and the plate is then submitted to an acid bichromate bath, such as was described in Step F above, and the three negative silver images 13, 6 and 5, respectively, removed, leaving the three positive, silver bromide, images 14, 8 and 7, as indicated in Fig. 10.

The plate is then developed as described in Step G, and a red sensation positive, silver image 9 obtained in layer 3, leaving positive, silver bromide images 8 and 14 in layers 4 and 12 respectively, as indicated in Fig. 11.

The side of the plate containing the images 8 and 9 is then submitted to a bath, such as was described in Step H, capable of transforming the silver bromide image 8 into a salt, such as an iodide, preferably insensitive, and capable of mordanting a dye, the other side of the plate being meanwhile protected from the action of such bath. The silver bromide image 8 is thus transformed into one of silver iodide, and this side of the plate is then submitted to a suitable basic green dye which will be absorbed to the silver iodide to produce a green image 11. The silver image 9 is then toned to a suitable blue or blue green tone by means of a bath, such as was described in Step H. When these two color images have been formed, the image 14 is transformed into a yellow image 15. This may be done by exposing it to light and developing in a staining pyro developer, afterward removing the silver, or by transforming it into an iodide and dyeing it, in a suitable yellow dye, care being taken to protect the previously formed color images on the other side of support 1. In Fig. 12 the iron toned image is indicated at 11, the red dyed image at 10, and the yellow image at 15.

A slight modification of the last described embodiment is shown in Fig. 13. In this, the red sensitive or panchromatic layer 3 is beneath the green sensitive layer 4, the blue sensitive layer 12 being on the opposite side of support 1.

The exposure would be made in a split beam camera, having a lens 16, light splitting mirror 17, and totally reflecting mirrors 18. This is a merely diagrammatic showing, as this type of optical system is well known. The emulsions on opposite sides of the support are thus exposed to separate beams, impinging from opposite directions. The treatment of this plate is analogous to that already fully described, and need not be outlined in detail. The final form is indicated in Fig. 14, where the yellow image 15 is indicated in layer 12, the green image 11 in originally red sensitive layer 3, and the red image 10 in originally green sensitive layer 4.

I consider as within the scope of my invention any multicolor process utilizing an element with differentially sensitized layers which after development are exposed to light of a color rendering the undeveloped salts of only one of the layers developable. In this connection it is to be noted that erythrosine, specified above as one of the sensitizing dyes, has the property of retaining its color sensitizing properties even when the element has been developed and bleached.

As before noted, the nature of the support is not material to the invention, and the invention is applicable to both still and motion photography. Several examples have been given as illustrative of the possibilities of variation in the embodiments of the invention, but it is to be understood that I contemplate as included within the scope of my invention all such modifications and equivalents as fall within the appended claims.

What I claim is:

1. The method of making a multi-color record that comprises the exposure to a multi-color light image of a plate carrying a plurality of sets of differentially sensitized particles, developing the affected particles to form images, exposing the plate to light of a color capable of affecting only one set of unaffected particles developing said set of particles to form an image, and removing said first developed images prior to said second development.

2. The method of making a multi-color record that comprises the exposure to a multi-color light image of a plate carrying a plurality of sets of silver salt particles, differentially sensitized to lights of different colors, developing the affected particles to form silver images and leaving the unaffected particles undeveloped, exposing the plate to light of a color capable of affecting the unaffected particles of one set only, developing said set to form a silver image, leaving undeveloped the particles unaffected by the second exposure, and removing said first developed silver images prior to said second development.

3. The method of making a multi-color record that comprises the exposure to a multi-color light image of a plate carrying a plurality of sets of silver salt particles, differentially sensitized to lights of different colors, developing the affected particles to form silver images and leaving the unaffected particles undeveloped, exposing the plate to light of a color capable of affecting the unaffected particles of one set only, developing said set to form a silver image, leaving undeveloped the particles unaffected by the second exposure, and removing said first developed silver images prior to second development, and transforming the remaining images of silver and of undeveloped particles into differently colored images.

4. The method of making a multi-color record that comprises the exposure to a multi-color light image of a plate carrying a plurality of differentially color sensitized layers containing silver halide particles, developing the affected particles to form images, exposing the plate to light of a color capable of rendering developable the particles in one layer only, developing said exposed particles in said layer to form a visible image, and removing said first developed images prior to said second development.

5. The method of making a multi-color record that comprises the exposure to a multi-color light image of a plate carrying a plurality of layers containing differentially color sensitized silver halide particles, developing the plate to form in the several layers color-component silver images and leaving complementary silver halide images in each layer, exposing the plate to light of a color capable of affecting the silver halide particles in one layer only, developing said exposed particle to form a silver image, and transforming the last named image into an image of one color the silver halide particles remaining in another layer into an image of another color, and removing the originally produced silver images prior to the second development.

6. In a process of color photography including the formation of images in differentially color sensitized layers carried by a common element by exposure and development, leaving unexposed differentially color sensitized particles in each of said layers, the method of forming an image in such particles of each layer, that comprises exposing the element to light of a color that renders the particles of one layer only developable, and thereafter developing said exposed particles and transforming them into an image of one color, transforming the remaining particles of the other layer into an image of a different color and during the process rendering the developed silver images light transmitting.

7. In a process of color photography including the formation of images in differentially color sensitized layers carried by a common element by exposure and development, leaving unexposed differentially color sensitized particles in each of said layers, the method of forming an image in such particles of each layer, that comprises exposing the element to light of a color that renders the particles of one layer only developable, and thereafter developing said exposed particles and transforming them into an image of one color, transforming the remaining particles of the other layer into an image of a different color, and also removing the originally developed images during the process.

8. The method of making a multi-color record that comprises the exposure to a multi-color light image of a plate carrying a plurality of sets of differentially sensitized particles, each such set constituting a separate layer, developing the affected particles to form images, exposing the plate to light of a color capable of affecting only one set of unaffected particles, removing the first developed images, and developing the remaining exposed set of particles to form an image.

9. The method of making a multi-color record that comprises the exposure to a multi-color light image of a plate carrying a plurality of sets of silver salt particles, differentially sensitized to lights of different colors, each such set constituting a separate layer, developing the affected particles to form silver images and leaving the unaffected particles undeveloped, exposing the plate to light of a color capable of affecting the unaffected particles of one set only, removing the first developed images, developing the remaining exposed particles to form a silver image, leaving undeveloped the particles unaffected by the second exposure.

10. The method of making a multi-color record that comprises the exposure to a multi-color light image of a plate carrying a plurality of sets of silver salt particles, differentially sensitized to lights of different colors, each such set constituting a separate layer, developing the affected particles to form silver images and leaving the unaffected particles undeveloped, exposing the plate to light of a color capable of affecting the unaffected particles of one set only, removing the first developed images, developing the remaining exposed particles to form a silver image, leaving undeveloped the particles unaffected by the second exposure, and transforming the remaining images of silver and of undeveloped particles into differently colored images.

11. The method of making a multi-color record that comprises the exposure to a multi-color light image of a plate carrying a plurality of differentially color sensitized layers containing silver halide particles, developing the affected particles to form images, exposing the plate to light of a color capable of rendering developable the particles in one layer only, removing the first developed images, and developing said exposed particles in said layer to form a visible image.

12. The method of making a multi-color record that comprises the exposure to a multi-color light image of a plate carrying a plurality of layers containing differentially color sensitized silver halide particles, developing the plate to form in the several layers color-component silver images and leaving complementary silver halide images in each layer, exposing the plate to light of a color capable of affecting the silver halide particles in one layer only, removing the first developed images, developing the remaining exposed particles to form a silver image, and transforming the last-named image into an image of one color and the silver halide particles remaining in another layer into an image of another color.

13. In a process of color photography including the formation of images in differentially color sensitized layers, carried by a common element, by exposure and development, leaving unexposed differentially color sensitized particles in each of said layers, the steps of forming an image in such particles of each layer that comprises exposing the element to light of a color that renders the particles of one layer only developable, removing the first developed images, and thereafter developing said exposed particles and transforming them into an image of one color and transforming the remaining particles of the other layer into an image of a different color.

JOHN G. CAPSTAFF.